United States Patent [19]

Tiffany, III

[11] Patent Number: 5,522,112
[45] Date of Patent: Jun. 4, 1996

[54] WIPING MIRROR FOR MOTOR VEHICLE

[75] Inventor: Harry J. Tiffany, III, Loveland, Colo.

[73] Assignee: Glen E. Means, Gillette, Wyo.

[21] Appl. No.: 275,787

[22] Filed: Jul. 15, 1994

[51] Int. Cl.⁶ .................... B60S 1/56; B60S 1/52
[52] U.S. Cl. .................... 15/250.003; 15/250.01; 15/250.26; 15/250.25; 15/250.29; 15/250.12; 74/424.8 R
[58] Field of Search .......... 15/250.26, 250.003, 15/250.29, 250.01, 250.12, 250.002, 250.25, 250.30; 74/424.8 R, 841

[56] References Cited

U.S. PATENT DOCUMENTS

| | | | |
|---|---|---|---|
| 1,719,731 | 7/1929 | Schroder | 15/250.26 |
| 2,885,708 | 5/1959 | Presser | 15/250.26 |
| 2,970,337 | 2/1961 | Presser | 15/250.26 |
| 4,870,713 | 10/1989 | Raynor | 15/250.26 |
| 4,873,740 | 10/1989 | Vahrenwald et al. | 15/250.003 |

FOREIGN PATENT DOCUMENTS

| | | | |
|---|---|---|---|
| 3721370 | 1/1988 | Germany | 15/250.003 |
| 4213506 | 10/1993 | Germany | 15/250.003 |
| 2025867 | 1/1980 | United Kingdom | 15/250.003 |
| 2063661 | 6/1981 | United Kingdom | 15/250.003 |
| 2065459 | 7/1981 | United Kingdom | 15/250.26 |

*Primary Examiner*—Gary K. Graham
*Attorney, Agent, or Firm*—William E. Hein

[57] ABSTRACT

A wiping mirror assembly for trucks and other motor vehicles employs a wiper carrier coupled to an off-the-shelf multiple start, high lead screw that is driven by a reversing motor via a belt. A magnetic switch positioned adjacent each end of the screw senses the approaching wiper carrier and reverses its direction of travel by reversing the motor. The assembly includes nozzles in a mirror housing for wetting the mirror.

1 Claim, 2 Drawing Sheets

WIPING MIRROR FOR MOTOR VEHICLE

BACKGROUND AND SUMMARY OF THE INVENTION

This invention relates generally to vehicle mirrors incorporating wipers for keeping the mirror surface visually clear and, more particularly, to an improved wiping mirror that employs a simpler, less costly mechanism for providing oscillating wiper movement.

Various wiping mirrors are known in the prior art. Exemplary of such wiping mirrors is that described in U.S. Pat. No. 4,873,740 to Vahrenwald et al., which utilizes a specialized level wound screw rotationally driven in a single direction. The presence of both left and right hand helix threads on such a screw causes the attached wiping mirror to reverse its direction of travel each time its reaches its limit of travel at either end of the screw. Not only is the mechanism of Vahrenwald et al. expensive to fabricate, but it is also maintenance intensive as a result of gears and other rapidly wearing parts. Moreover, this mechanism is susceptible to jamming whenever motion is halted during a wiping cycle, as frequently occurs in intermittent wiper applications.

It is therefore the principal object of the present invention to provide an improved wiping mirror for trucks and other motor vehicles that is less expensive to produce and more reliable to operate than prior art wiping mirrors.

This and other objects are accomplished in accordance with the illustrated preferred embodiment of the present invention by providing a wiper carrier coupled to an off-the-shelf multiple start, high lead screw that is driven by a reversing motor. A magnetic switch positioned adjacent each end of the screw senses the approaching wiper carrier and reverses its direction of travel by reversing the motor.

DESCRIPTION OF THE PREFERRED EMBODIMENTS

Figure 1:
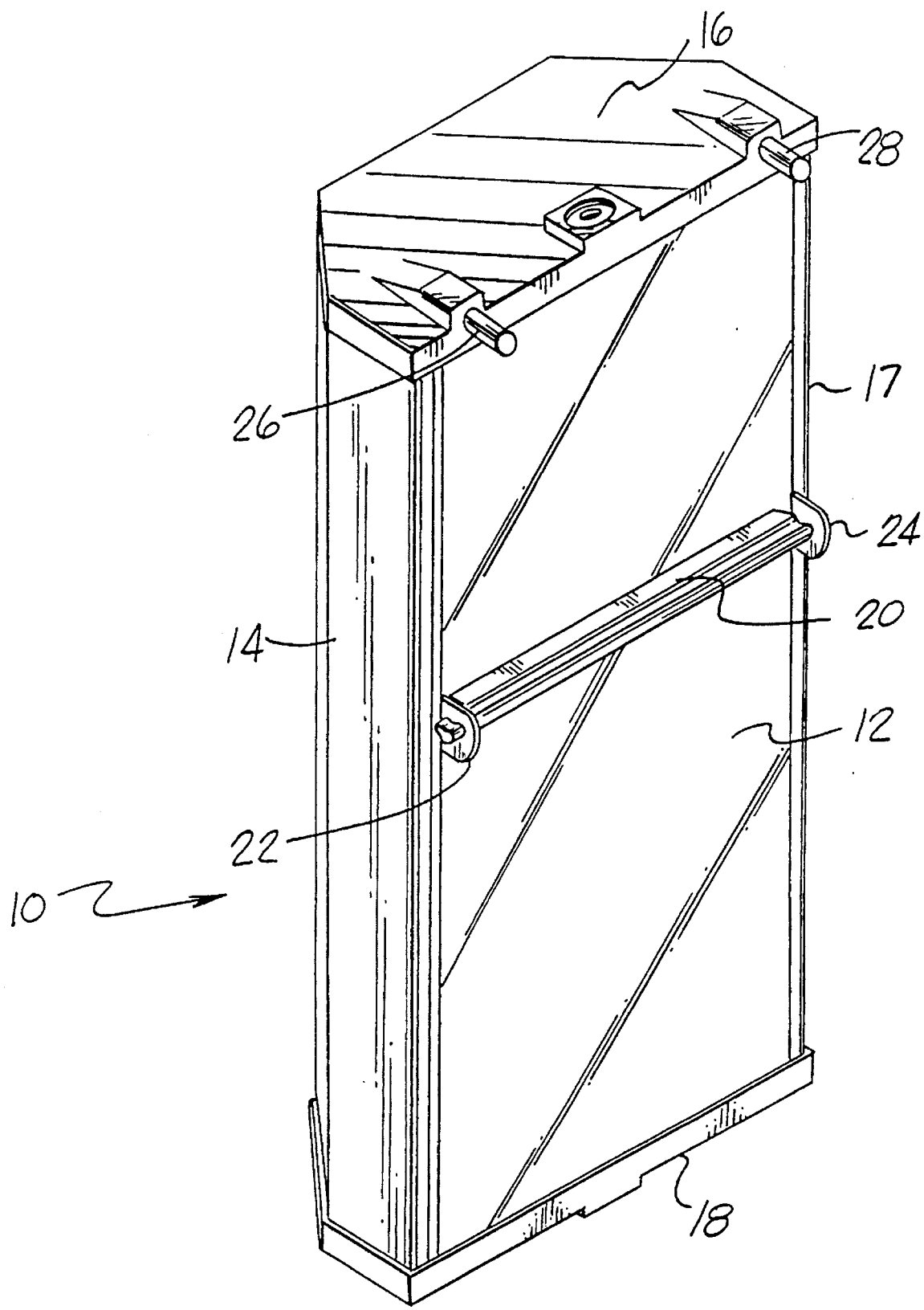
FIG. 1 is an overall pictorial diagram of a wiping mirror assembly for motor vehicles constructed in accordance with the present invention.

Referring now to FIG. 1, there is shown an overall pictorial diagram of a wiping mirror assembly 10 that includes an outwardly facing mirror 12 mounted in a generally concave mirror housing having longitudinal side portions 14, 17 and top and bottom end plates 16 and 18. Mirror 12 may be sealably attached to side portions 14, 17 of the mirror housing using conventional gasket material. A wiper blade 20 is positioned for wiping engagement with the outwardly facing surface of mirror 12. Wiper blade 20 is connected to a wiper carrier within wiping mirror assembly 10 by means of a pair of brackets 22, 24 that are positioned for longitudinal travel between the edges of mirror 12 and side portions 14, 17 of the mirror housing. A pair of nozzles 26, 28 may be provided in end plate 16 to direct water or other cleaning liquid onto the outwardly facing surface of mirror 12. A conventional heating element (not illustrated) may be provided on the inside surface of mirror 12 to provide deicing capability.

Figure 2:
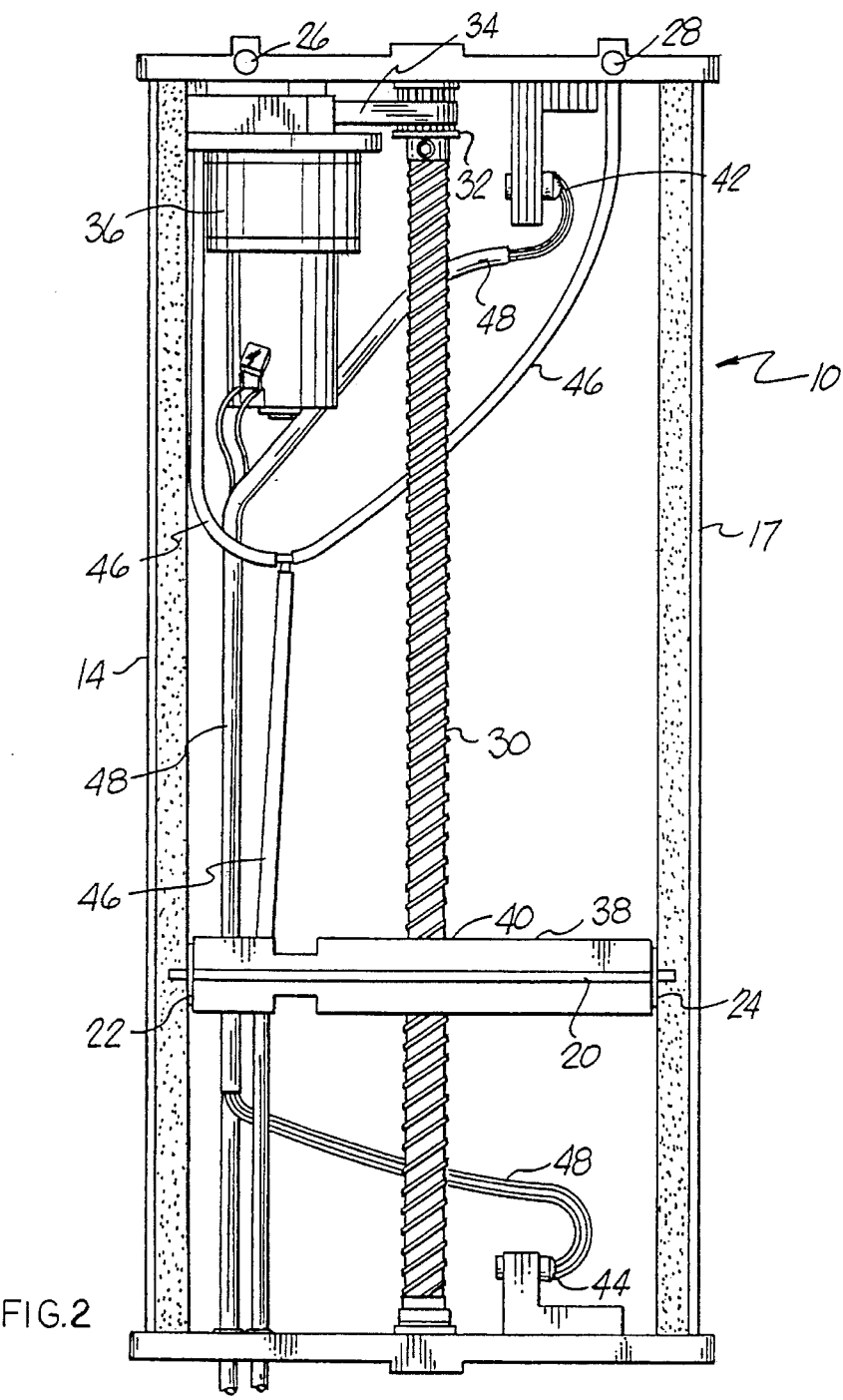
FIG. 2 is a detailed pictorial diagram of the interior of the wiping mirror assembly of FIG. 1 in the absence of the mirror itself.
Figure 3:
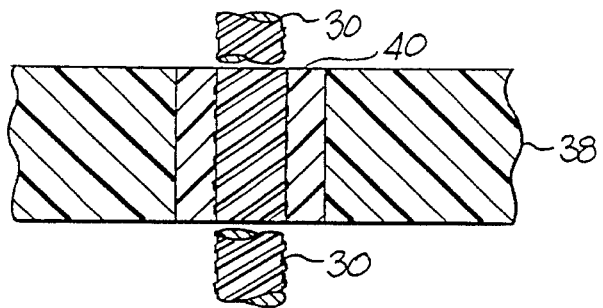
FIG. 3 is a detailed cross-sectional diagram illustrating how a wiper carrier of FIG. 2 is coupled to a driving screw.

Referring now to FIG. 2, there is shown a detailed pictorial diagram of the components of the wiping mirror assembly 10 that are located within the mirror housing. A elongated, multiple start, high lead screw 30 having a single left or right hand helix thread is vertically mounted between conventional self-aligning bushings in top and bottom end plates 16, 18 of the mirror housing. Screw 30 may comprise, for example, a commercially available Acme lead screw BSA #SPR5010. Screw 30 is reversibly driven by means of timing belt pulley 32, timing belt 34, and motor 36. Screw 30 is substantially parallel to a longitudinal axis of the motor 36. Motor 36 may comprise any of a number of reversible D.C. motors commercially available as off-the-shelf components. A wiper carrier 38, to which wiper 20 is attached, is coupled to screw 30 by way of a threaded insert 40 that is centrally positioned in wiper carrier 38. As screw 30 is driven by motor 36, wiper carrier 38 moves upward or downward along screw 30, depending on the direction of rotation of screw 30. A pair of magnetic switches 42, 44 are mounted to top and bottom end plates 16, 18 to sense the presence of wiper carrier 38 at the respective end of screw 30 and to thereupon reverse motor 36 to, in turn, reverse the direction of rotation of screw 30. Water or other cleaning fluid flows from an external reservoir and pump to nozzles 26, 28 via flexible tubing 46. Operating power for D.C. motor 36 and magnetic switches 42, 44 is supplied from an external source through a wiring harness 48.

I claim:

1. A wiping mirror assembly comprising:

a mirror housing, said mirror housing having top and bottom end plates and longitudinal side members;

a mirror having an outwardly facing surface to be wiped, said mirror being positioned within and coupled to said mirror housing between said top and bottom end plates and said longitudinal side members;

a multiple start, high lead screw rotatably mounted within and to said mirror housing between said top and bottom end plates;

a reversible motor mounted within and to said mirror housing, said motor being positioned such that a longitudinal axis thereof is substantially parallel with a longitudinal axis of said screw;

belt driving means within said mirror housing, said belt driving means coupling said motor to said screw;

a wiper carrier coupled to said screw such that said wiper carrier travels longitudinally in a first direction along said screw as said screw rotates in a first direction and said wiper carrier travels longitudinally in an opposite direction when said screw rotates in an opposite direction;

an elongated wiper blade horizontally positioned for wiping engagement with said outwardly facing surface of said mirror, said wiper blade having first and second ends;

bracket means comprising first and second brackets respectively connecting said first and second ends of said wiper blade to said wiper carrier;

motor switching means mounted within said mirror housing for sensing a position of said wiper carrier proximate each of said top and bottom end plates and for then reversing the motor to thereby reverse the direction of rotation of said screw and the direction of travel of said wiper carrier; and a pair of spaced apart washer nozzles mounted within and extending from a front edge of said top end plate adjacent said outwardly facing surface of said mirror, said pair of washer nozzles being connected via tubing within said mirror housing to an external reservoir containing a liquid to be sprayed onto said outwardly facing surface of said mirror by said washer nozzles.

* * * * *